United States Patent
Urata

(10) Patent No.: US 10,640,579 B2
(45) Date of Patent: May 5, 2020

(54) MODIFIED CONJUGATED DIENE-BASED POLYMER AND RUBBER COMPOSITION CONTAINING SAME

(71) Applicant: BRIDGESTONE CORPORATION, Tokyo (JP)

(72) Inventor: Tomohiro Urata, Tokyo (JP)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 0 days.

(21) Appl. No.: 15/547,828

(22) PCT Filed: Jan. 21, 2016

(86) PCT No.: PCT/JP2016/051740
§ 371 (c)(1),
(2) Date: Aug. 1, 2017

(87) PCT Pub. No.: WO2016/125596
PCT Pub. Date: Aug. 11, 2016

(65) Prior Publication Data
US 2018/0016361 A1 Jan. 18, 2018

(30) Foreign Application Priority Data
Feb. 6, 2015 (JP) ................. 2015-022612

(51) Int. Cl.
*C08C 19/22* (2006.01)
*C08L 15/00* (2006.01)
*C08C 19/00* (2006.01)

(52) U.S. Cl.
CPC .............. *C08C 19/22* (2013.01); *C08C 19/00* (2013.01); *C08L 15/00* (2013.01)

(58) Field of Classification Search
CPC ......... C08C 19/00; C08C 19/22; C08L 15/00; C08L 7/00
See application file for complete search history.

(56) References Cited

U.S. PATENT DOCUMENTS

| | | | |
|---|---|---|---|
| 3,444,134 A | 5/1969 | Soldatos | |
| 3,582,514 A | 6/1971 | Soldatos | |
| 4,499,243 A | 2/1985 | Rader | |
| 2007/0010610 A1 | 1/2007 | Kondo | |
| 2009/0275675 A1 | 11/2009 | Yagi et al. | |
| 2012/0172491 A1 | 7/2012 | Miyazaki | |
| 2012/0302665 A1* | 11/2012 | Wang | B60C 1/0016 523/157 |
| 2014/0051799 A1* | 2/2014 | Morita | B60C 1/00 524/572 |

FOREIGN PATENT DOCUMENTS

| | | |
|---|---|---|
| CA | 1025147 A | 1/1978 |
| GB | 743587 A | 1/1956 |
| GB | 1271830 A | 4/1972 |
| JP | 51-054520 A | 5/1976 |
| JP | 55-045761 A | 3/1980 |
| JP | 63-008403 A | 1/1988 |
| JP | 2004-359713 A | 12/2004 |
| JP | 2004-359714 A | 12/2004 |
| JP | 2004-359716 A | 12/2004 |
| JP | 2004-359717 A | 12/2004 |
| JP | 2004-359773 A | 12/2004 |
| JP | 2006-152045 A | 6/2006 |
| JP | 2006-152171 A | 6/2006 |
| JP | 2011-026388 A | 2/2011 |
| TW | 201425421 A | 7/2014 |

OTHER PUBLICATIONS

Communication dated Oct. 12, 2017 from the European Patent Office in counterpart European application No. 16746427.0.
International Search Report for PCT/JP2016/051740, dated Mar. 22, 2016.

* cited by examiner

*Primary Examiner* — Robert S Jones
(74) *Attorney, Agent, or Firm* — Sughrue Mion, PLLC

(57) ABSTRACT

The present invention provides a modified conjugated diene polymer in which a phenoxy group of a polar group-containing phenoxy compound is bonded to at least one selected from the group consisting of the end, main chain, and side chain of a conjugated diene polymer, which can further improve a rubber composition in the low-heat-generation property and abrasion resistance, and a rubber composition using the same.

3 Claims, No Drawings

MODIFIED CONJUGATED DIENE-BASED POLYMER AND RUBBER COMPOSITION CONTAINING SAME

CROSS REFERENCE TO RELATED APPLICATIONS

This application is a National Stage of International Application No. PCT/JP2016/051740 filed Jan. 21, 2016, claiming priority based on Japanese Patent Application No. 2015-022612 filed Feb. 6, 2015, the contents of all of which are incorporated herein by reference in their entirety.

TECHNICAL FIELD

The present invention relates to a modified conjugated diene polymer which can improve the low-heat-generation property and abrasion resistance, and a rubber composition containing the same.

BACKGROUND ART

In recent years, from the viewpoint of conserving energy, tires having a small rolling resistance are demanded. For this reason, as a rubber composition used in a tire tread and the like, a rubber composition having a low tan δ and excellent low-heat-generation property is demanded. Further, the rubber composition for use in a tread is required to have excellent abrasion resistance as well as excellent low-heat-generation property. For meeting such demands, in order to improve the low-heat-generation property and abrasion resistance of the rubber composition, various attempts are made to improve the affinity of a filler, such as carbon black or silica, with a rubber component in the rubber composition.

For example, PTL 1 has proposed a modified natural rubber which is obtained by adding a polar group-containing compound to at least one natural rubber raw material selected from the group consisting of natural rubber, a natural rubber latex coagulation product, and a natural rubber cup lump, and applying a mechanical shear force to the resultant mixture to cause graft polymerization or addition.

PTL 2 discloses a modified natural rubber latex which is obtained by adding a polar group-containing mercapto compound to a natural rubber latex so that the polar group-containing mercapto compound is added to natural rubber molecules in the natural rubber latex.

Further, PTLs 3 to 6 have proposed a modified natural rubber which is obtained by graft-polymerizing various polar group-containing monomers on a natural rubber latex.

However, for obtaining a rubber component which has a further improved affinity with a reinforcing filler formed from carbon black and/or silica so as to enable the rubber composition to be further improved in low-heat-generation property and abrasion resistance, the modified conjugated diene polymer is needed to be further improved.

CITATION LIST

Patent Literature

PTL 1: JP-A 2006-152171
PTL 2: JP-A 2006-152045
PTL 3: JP-A 2004-359716
PTL 4: JP-A 2004-359717
PTL 5: JP-A 2004-359713
PTL 6: JP-A 2004-359714

SUMMARY OF INVENTION

Technical Problem

In this situation, an object of the present invention is to provide a modified conjugated diene polymer which can further improve a rubber composition in the low-heat-generation property and abrasion resistance, and a rubber composition using the same.

Solution to Problem

The present inventor made attempts to modify a conjugated diene polymer with various compounds in order to achieve the above object, and has found that the object of the present invention can be achieved by modifying a conjugated diene polymer with a specific compound, and the present invention has been completed.

Specifically, the present invention is directed to a modified conjugated diene polymer in which a phenoxy group of a polar group-containing phenoxy compound is bonded to at least one selected from the group consisting of the end, main chain, and side chain of a conjugated diene polymer.

Advantageous Effects of Invention

In the present invention, there can be provided a modified conjugated diene polymer which can further improve a rubber composition in the low-heat-generation property and abrasion resistance, and a rubber composition using the same.

DESCRIPTION OF EMBODIMENTS

[Modified Conjugated Diene Polymer]

The present invention provides a modified conjugated diene polymer in which a phenoxy group of a polar group-containing phenoxy compound is bonded to at least one selected from the group consisting of the end, main chain, and side chain of a conjugated diene polymer.

The conjugated diene polymer used in the modified conjugated diene polymer of the present invention means a polymer which does not contain a non-conjugated olefin as a monomer unit component (a part of a copolymer). Styrene is not included in the non-conjugated olefin.

With respect to the conjugated diene polymer, there is no particular limitation, and the conjugated diene polymer may be any of a diene homopolymer and a diene copolymer, and can be appropriately selected according to the purpose, and, for example, there can be mentioned natural rubber (NR), various polybutadiene rubbers (BR), a synthetic polyisoprene rubber (IR), various styrene-butadiene copolymer rubbers (SBR), a styrene-isoprene copolymer rubber (SIR), a styrene-isoprene-butadiene terpolymer rubber, an isoprene-butadiene copolymer rubber (IBR), an acrylonitrile-butadiene copolymer rubber (NBR), and a chloroprene rubber. Of these, at least one selected from natural rubber and an emulsion-polymerized styrene-butadiene copolymer rubber is preferred, and natural rubber is especially preferred.

[Polar Group-Containing Phenoxy Compound]

The polar group-containing phenoxy compound in the present invention is preferably a polar group-containing phenolic compound represented by the following general formula (I).

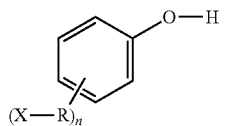 (I)

In the general formula (I), R is a single bond or a hydrocarbon group having 1 to 10 carbon atoms, and X is a polar group. n is 1 to 5. When a plurality of —R—X are present, they may be the same or different. Further, a plurality of X's may be bonded to a single R, and, in this case, X's may be the same or different.

In the present invention, the wording "R is a single bond" means that X adjacent to R in the general formula (I) is bonded directly to an aromatic ring through a single bond.

It is preferred that the polar group of the polar group-containing phenoxy compound in the present invention is at least one selected from the group consisting of an amino group, an imino group, a nitrile group, an ammonium group, an imide group, an amide group, a hydrazo group, an azo group, a diazo group, a sulfide group, a disulfide group, a sulfonyl group, a sulfinyl group, a thiocarbonyl group, a hydroxyl group, a carboxyl group, a carbonyl group, an epoxy group, an oxycarbonyl group, a nitrogen-containing heterocyclic group, an oxygen-containing heterocyclic group, a tin-containing group, and an alkoxysilyl group. Of these, the polar group is especially preferably at least one selected from an amino group and a carboxyl group. In this case, at least one selected from an amino group and a carboxyl group may be directly bonded to an aromatic ring, or at least one selected from an amino group and a carboxyl group may be bonded to a hydrocarbon group directly bonded to an aromatic ring. Alternatively, at least one selected from an amino group and a carboxyl group may be directly bonded to an aromatic ring, and another one may be bonded to a hydrocarbon group directly bonded to the aromatic ring. At least one selected from an amino group and a carboxyl group may be present in at least one selected from the group consisting of a peptide-derived monovalent group and a protein-derived monovalent group.

It is preferred that the modified conjugated diene polymer of the present invention has both an amino group and a carboxyl group as the polar group.

The polar group-containing phenoxy compound in the present invention is preferably at least one polar group-containing (thio)phenolic compound selected from the group consisting of tyrosine, amidol, 4-aminophenol, 4-(aminomethyl)phenol, 4-hydroxybenzoic acid, 4-hydroxybenzyl alcohol, 4-triethoxysilylphenol, 4-[(2-triethoxysilyl)ethyl]phenol, and 4-[(2-triethoxysilyl)ethylthio]phenol, and at least one selected from the group consisting of a peptide having tyrosine and a protein having tyrosine. Of these, the polar group-containing phenoxy compound is further preferably at least one selected from the group consisting of tyrosine, a peptide having tyrosine, and a protein having tyrosine.

The modified conjugated diene polymer of the present invention is preferably formed in a way such that the phenoxy group of the polar group-containing phenoxy compound produces phenoxy radials due to a phenol oxidase, such as laccase, and the resultant radials are added to at least one site of the conjugated diene polymer selected from the end of the conjugated diene polymer, a double bond of the main chain, a double bond of the side chain, the α-position of a double bond of the main chain, and the α-position of a double bond of the side chain to form a modified conjugated diene polymer.

As a phenol oxidase, laccase is preferred. Laccase is an oxidase having the ability to oxidize a phenol.

As examples of a reaction in which the conjugated diene polymer is reacted with the polar group-containing phenoxy compound to form the modified conjugated diene polymer of the present invention, the reaction formula (II) and reaction formula (III) are shown below. The reaction formula (II) shows a case in which a reaction occurs at the main chain of the conjugated diene polymer. The modified conjugated diene polymer (II-a) shows a case in which the polar group-containing phenoxy compound has been added to a double bond of the main chain of the conjugated diene polymer, and the modified conjugated diene polymer (II-b) shows a case in which the polar group-containing phenoxy compound has been added to the α-position of a double bond of the main chain of the conjugated diene polymer.

The reaction formula (III) shows a case in which a reaction occurs at the side chain or the α-position of a double bond of the side chain of the conjugated diene polymer. The modified conjugated diene polymers (III-a) and (III-b) show a case in which the polar group-containing phenoxy compound has been added to a double bond of the side chain of the conjugated diene polymer, and the modified conjugated diene polymer (III-c) shows a case in which the polar group-containing phenoxy compound has been added to the α-position of a double bond of the side chain of the conjugated diene polymer.

The reaction for forming the modified conjugated diene polymer of the present invention is not limited to the reaction formula (II) and reaction formula (III).

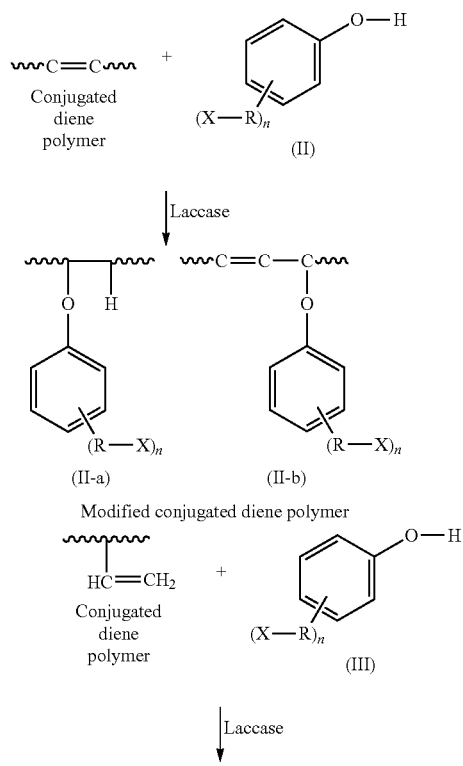

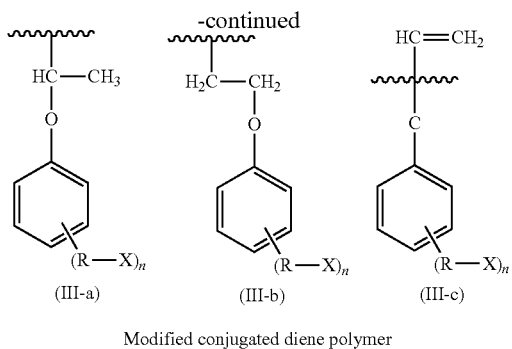

Modified conjugated diene polymer

In the present invention, the modification degree (millimole) means an amount [mmol (millimole)] of the polar group-containing phenoxy compound bonded in 100 g of the modified conjugated diene polymer. In the present invention, the amount of the polar group-containing phenoxy compound bonded in 100 g of the modified conjugated diene polymer is preferably 0.005 to 55 mmol, more preferably 0.01 to 27 mmol, further preferably 0.05 to 16 mmol.

Further, the addition amount means an amount (part(s) by mass) of the polar group-containing phenoxy compound bonded to 100 parts by mass of the modified conjugated diene polymer.

The modification degree in the present invention (the amount [mmol (millimole)] of the polar group-containing phenoxy compound bonded in 100 g of the modified conjugated diene polymer) is quantitatively determined by means of a pyrolysis gas chromatography mass spectrometer (GC-MS). When the polar group-containing phenoxy compound contains a peptide-derived monovalent group, a protein-derived monovalent group, or an amino acid-derived monovalent group (for example, the polar group-containing phenoxy compound containing an amino acid-derived monovalent group includes tyrosine), the modification degree is determined as follows. A sample to be tested is immersed in 6 N hydrochloric acid at 110° C. for 24 hours to cause the contained protein or peptide to suffer a hydrolysis reaction, and the noncovalent-bonded amino acid is removed by reprecipitation. As a result, only the amino acid covalent-bonded to the polymer remains, and it is quantitatively determined by a pyrolysis GC-MS. The amount of the amino acid covalent-bonded to the modified conjugated diene polymer is taken as an amount of the polar group-containing phenoxy compound bonded.

The modified conjugated diene polymer of the present invention is produced, for example, as follows.

In the present invention, generally, the above-mentioned polar group-containing phenoxy compound is added to a solution obtained by adding water and optionally an emulsifying agent to a latex, an aqueous emulsion, or an aqueous dispersion of at least one conjugated diene polymer selected from natural rubber and a synthetic conjugated diene polymer, and stirred at a predetermined temperature to cause the polar group-containing phenoxy compound to undergo an addition reaction to a double bond of or the α-position of a double bond of at least one of the main chain and side chain of the conjugated diene polymer molecule in the latex, aqueous emulsion, or aqueous dispersion of the conjugated diene polymer. As a result, the phenoxy group of the polar group-containing phenoxy compound is bonded, particularly, covalently bonded to at least one selected from the group consisting of the end, main chain, and side chain of the conjugated diene polymer to obtain a modified conjugated diene polymer. In the addition of the polar group-containing phenoxy compound to the latex, aqueous emulsion, or aqueous dispersion of the conjugated diene polymer, a phenol oxidase (preferably laccase) and, if desired, an emulsifying agent may be added in advance to the latex, aqueous emulsion, or aqueous dispersion of the conjugated diene polymer, or the polar group-containing phenoxy compound may be emulsified using an emulsifying agent and then added, together with a phenol oxidase (preferably laccase), to the latex, aqueous emulsion, or aqueous dispersion of the conjugated diene polymer. If necessary, an organic peroxide may be further added. With respect to the emulsifying agent which can be used in emulsifying the latex, aqueous emulsion, or aqueous dispersion of the conjugated diene polymer and/or the polar group-containing phenoxy compound, there is no particular limitation, and examples of emulsifying agents include nonionic surfactants, such as polyoxyethylene lauryl ether.

For mixing a filler, such as carbon black or silica, into the modified conjugated diene polymer of the present invention to improve the low-heat-generation property and abrasion resistance of a rubber composition without causing the processability of the rubber composition to be poor, it is important that the polar group-containing phenoxy compound is introduced in a small amount uniformly into the individual conjugated diene polymer molecules. Therefore, the above-mentioned modification reaction is preferably conducted while stirring, for example, the ingredients including the latex, aqueous emulsion, or aqueous dispersion of the conjugated diene polymer, and the polar group-containing phenoxy compound and others are charged into a reaction vessel, and subjected to reaction at 30 to 80° C. for 10 minutes to 24 hours to obtain a latex, aqueous emulsion, or aqueous dispersion of a modified conjugated diene polymer having the polar group-containing phenoxy compound added to conjugated diene polymer molecules. The thus-obtained latex, aqueous emulsion, or aqueous dispersion of the modified conjugated diene polymer may be used as such in the form of a latex, aqueous emulsion, or aqueous dispersion, or may be further coagulated and dried and used in a solid state. When used in a rubber composition, the modified conjugated diene polymer is preferably used in the form of a solid rubber. When used in the form of a solid rubber, the latex, aqueous emulsion, or aqueous dispersion of the modified conjugated diene polymer is coagulated, and washed and then dried using a dryer, such as a vacuum dryer, an air dryer, a drum dryer, or a double-screw extruder, obtaining a modified conjugated diene polymer in a solid state. With respect to the coagulant used for coagulating the latex, aqueous emulsion, or aqueous dispersion of the modified conjugated diene polymer, there is no particular limitation, but examples of coagulants include acids, such as formic acid and sulfuric acid, and salts, such as sodium chloride.

When the modified conjugated diene polymer of the present invention is a modified natural rubber, a protein containing tyrosine contained in a natural rubber latex also participates in the reaction, and therefore, even when the amount of the polar group-containing phenoxy compound added is 0 part by mass, a modified natural rubber may be formed. Therefore, the amount of the polar group-containing phenoxy compound added to the conjugated diene polymer before being modified is, relative to 100 parts by mass of the conjugated diene polymer, preferably 0 to 10 parts by mass, more preferably 0 to 7 parts by mass, further preferably 0 to 5 parts by mass, especially preferably 0 to 3 parts by mass. When the amount of the polar group-containing phenoxy compound added is 3 parts by mass or less, inherent physical properties of the conjugated diene polymer, such as viscoelasticity and S—S characteristics (stress-strain curve measured by a tensile tester), are not largely changed, and not only can inherent excellent physical properties of the conjugated diene polymer be secured, but also the processability of the rubber composition can be especially advantageously maintained or improved.

Further, in the modified synthetic conjugated diene polymer other than natural rubber, the amount of the polar group-containing phenoxy compound added to the synthetic conjugated diene polymer is, relative to 100 parts by mass of the synthetic conjugated diene polymer, preferably 0.01 to 10 parts by mass, more preferably 0.05 to 5 parts by mass, further preferably 0.1 to 3 parts by mass. When the amount of the polar group-containing phenoxy compound added is 0.1 part by mass or more, it is possible to especially advantageously improve the rubber composition in the low-heat-generation property and abrasion resistance. Further, when the amount of the polar group-containing phenoxy compound added is 3 parts by mass or less, inherent physical properties of the conjugated diene polymer are not largely changed, and not only can inherent excellent physical properties of the conjugated diene polymer be secured, but also the processability of the rubber composition can be especially advantageously maintained or improved.

The rubber component of the rubber composition of the present invention can contain, in addition to the modified conjugated diene polymer, another diene rubber in such an amount that the object of the present invention can be achieved. For example, it is preferred that, in the rubber component, the modified conjugated diene polymer is contained in an amount of 50 to 100% by mass and another diene rubber is contained in an amount of 50 to 0% by mass. As another diene rubber, at least one selected from the group consisting of natural rubber, a styrene-butadiene copolymer rubber, a polybutadiene rubber, a polyisoprene rubber, an acrylonitrile-butadiene copolymer rubber, a butyl rubber, a halogenated butyl rubber (such as Cl-IIR or Br-IIR), an ethylene-propylene-diene terpolymer rubber (EPDM), an ethylene-butadiene copolymer rubber (EBR), a propylene-butadiene copolymer rubber (PBR), and a chloroprene rubber, or the like can be used. One type of the modified conjugated diene polymer may be individually used, or two or more types of the modified conjugated diene polymers may be used in the form of a blend, and one type of the other diene rubber may be individually used, or two or more types of the other diene rubbers may be used in the form of a blend.

It is preferred that the rubber composition of the present invention further contains a filler, in addition to a rubber component containing the modified conjugated diene polymer. With respect to the amount of the filler mixed, there is no particular limitation, but the amount of the filler is, relative to 100 parts by mass of the rubber component containing the modified conjugated diene polymer, preferably in the range of from 5 to 150 parts by mass, further preferably in the range of from 10 to 100 parts by mass. When the amount of the filler mixed is 5 parts by mass or more, reinforcing properties can be advantageously obtained, and, when the amount of the filler mixed is 150 parts by mass or less, it is possible to prevent the processability from becoming poor.

As a filler mixed into the rubber composition of the present invention, at least one selected from carbon black and an inorganic filler is used.

With respect to the carbon black, there is no particular limitation, and, for example, at least one carbon black selected from the group consisting of SAF, ISAF, IISAF, N339, HAF, FEF, GPF, and SRF grades of a high, medium, or low structure is preferably used, especially, at least one carbon black selected from the group consisting of SAF, ISAF, IISAF, N339, HAF, and FEF grades is preferably used. The nitrogen adsorption specific surface area ($N_2SA$, as measured in accordance with JIS K 6217-2:2001) of carbon black is preferably 30 to 250 m$^2$/g.

One type of the carbon black may be individually used, or two or more types of the carbon black may be used in combination. In the present invention, carbon black is not included in the inorganic filler.

With respect to the inorganic filler mixed into the rubber composition of the present invention, from the viewpoint of achieving both the low-heat-generation property and the abrasion resistance, silica is preferred. As silica, any commercially available products can be used, and, of these, wet precipitated (precipitated) silica, wet gelled silica, dry silica, or colloidal silica is preferably used, and wet precipitated silica is especially preferably used. Silica preferably has a BET specific surface area (as measured in accordance with ISO 5794/1) of 40 to 350 m$^2$/g. The silica having a BET surface area in this range has an advantage in that both the rubber reinforcing properties and dispersibility in the rubber component can be achieved. From this point of view, silica having a BET surface area in the range of from 80 to 350 m$^2$/g is further preferred, and silica having a BET surface area in the range of from 120 to 350 m$^2$/g is especially preferred. As the above-mentioned silica, commercially available products, such as trade name "Nipsil AQ" (BET specific surface area=205 m$^2$/g), "Nipsil KQ", manufactured by Tosoh Silica Corporation, and trade name "Ultrasil VN3" (BET specific surface area=175 m$^2$/g), manufactured by Degussa AG, can be used.

With respect to the inorganic filler mixed into the rubber composition of the present invention, an inorganic compound represented by the following general formula (IV) can be used instead of silica or in addition to silica.

$$dM^1 \cdot xSiO_y \cdot zH_2O \qquad (IV)$$

In the general formula (IV) above, $M^1$ is at least one selected from a metal selected from the group consisting of aluminum, magnesium, titanium, calcium, and zirconium, an oxide and a hydroxide of the metal, a hydrate thereof, and a carbonate of the metal, and d, x, y, and z are, respectively, an integer of 1 to 5, an integer of 0 to 10, an integer of 2 to 5, and an integer of 0 to 10.

When both x and z in the general formula (IV) are 0, the inorganic compound is at least one metal selected from aluminum, magnesium, titanium, calcium, and zirconium, an oxide of the metal, or a hydroxide of the metal.

In the general formula (IV) above, $M^1$ is preferably at least one selected from aluminum metal, an oxide and a hydroxide of aluminum, a hydrate thereof, and a carbonate of aluminum, and is especially preferably aluminum hydroxide [$Al(OH)_3$].

With respect to the inorganic filler in the present invention, silica may be solely used, or silica and one type or more of the inorganic compound represented by the general formula (IV) may be used in combination.

In the rubber composition of the present invention, various mixing additives generally mixed into a rubber composition, e.g., a vulcanization activator, such as stearic acid, resin acid, or zinc oxide, a vulcanization accelerator, an antioxidant, and a softening agent are kneaded, if necessary, in the first stage or the final stage for kneading, or in an intermediate stage between the first stage and the final stage.

In the present invention, as a kneading apparatus, a Banbury mixer, an intermeshing internal mixer, a roll, an intensive mixer, a kneader, a double-screw extruder, or the like is used.

INDUSTRIAL APPLICABILITY

By using the modified conjugated diene polymer of the present invention as a rubber component of a rubber composition, a rubber composition having excellent low-heat-generation property and excellent abrasion resistance can be obtained, and therefore is advantageously used as a rubber composition for use in members for various types of tires (particularly, various pneumatic radial tires) for a passenger car, a small-size truck, a light passenger car, a light truck, and a large-size vehicle (for truck and bus, for off-road tire (for vehicle for construction, vehicle for mine, and the like)) and the like, particularly for use in members for tread of various pneumatic radial tires (especially a member for a tread grounding part).

The invention claimed is:

1. A modified conjugated diene polymer in which a phenoxy group of a polar group-containing phenoxy compound is bonded to at least one selected from the group consisting of the end, main chain, and side chain of a conjugated diene polymer,
   wherein the polar group is at least one selected from the group consisting of an amino group, an imino group, a nitrile group, an ammonium group, an imide group, an amide group, a hydrazo group, an azo group, a diazo group, a sulfide group, a disulfide group, a sulfonyl group, a sulfinyl group, a thiocarbonyl group, a hydroxyl group, a carboxyl group, a carbonyl group, an epoxy group, an oxycarbonyl group, a nitrogen-containing heterocyclic group, an oxygen-containing heterocyclic group, a tin-containing group, and an alkoxysilyl group,
   wherein the amount of the polar group-containing phenoxy compound bonded in 100 g of the modified conjugated diene polymer is from 0.005 to 55 mmol, and
   wherein the polar group-containing phenoxy compound is at least one selected from the group consisting of tyrosine, a peptide having tyrosine, and a protein having tyrosine.

2. The modified conjugated diene polymer according to claim 1, wherein the conjugated diene polymer is natural rubber.

3. A rubber composition comprising the modified conjugated diene polymer according to claim 1.

* * * * *